United States Patent [19]

Kleinberger et al.

[11] Patent Number: 5,350,117
[45] Date of Patent: Sep. 27, 1994

[54] DISCRIMINATING HUMIDIFICATION SYSTEM

[76] Inventors: Itamar Kleinberger, 4367 Dunmore Rd., Marietta, Ga. 30068; John J. Hayman, Jr., 1882 Wicks Valley Dr., Marietta, Ga. 30062

[21] Appl. No.: 980,301

[22] Filed: Nov. 23, 1992

Related U.S. Application Data

[63] Continuation-in-part of Ser. No. 830,190, Jan. 31, 1992, Pat. No. 5,193,354.

[51] Int. Cl.⁵ .............................................. E03C 1/08
[52] U.S. Cl. ................................. 239/428.5; 239/500; 239/590.5; 261/78.2; 261/116
[58] Field of Search ................... 239/500, 501, 428.5, 239/429–434; 261/78.2, 116

[56] References Cited

U.S. PATENT DOCUMENTS

| | | | |
|---|---|---|---|
| 924,500 | 6/1909 | Rush | 261/117 |
| 1,020,937 | 3/1912 | Warwick | 299/58 |
| 1,650,739 | 11/1927 | Ridler | 239/64 |
| 1,673,694 | 6/1928 | McLeod | 299/62 |
| 1,778,141 | 10/1930 | Birdsong et al. | 62/347 |
| 1,860,600 | 5/1932 | Slaymaker | 299/58 |
| 1,863,914 | 6/1932 | Tyler | 299/58 |
| 1,889,499 | 11/1932 | Rorrer et al. | 261/117 |
| 1,908,968 | 5/1933 | Forman | 261/117 |
| 1,926,651 | 9/1933 | Rombach | 299/58 |
| 1,950,204 | 3/1934 | Wood et al. | 261/117 |
| 1,951,587 | 3/1934 | Tyler | 299/58 |
| 2,011,731 | 8/1935 | Rorrer et al. | 62/89.5 |
| 2,036,446 | 4/1936 | Tsutsumi | 299/87 |
| 2,038,464 | 4/1936 | Wood | 211/127 |
| 2,039,768 | 5/1936 | Bird | 299/62 |
| 2,065,358 | 12/1936 | Zarotschenzeff | 99/194 |
| 2,066,312 | 1/1937 | Bales | 62/89.5 |
| 2,090,326 | 8/1937 | Glattke | 299/58 |
| 2,097,530 | 11/1937 | Peddicord | 62/89.5 |
| 2,263,194 | 11/1941 | Shepherd | 261/30 |
| 2,281,458 | 4/1942 | Schadegg | 62/37 |
| 2,299,046 | 10/1942 | West | 99/154 |
| 2,336,125 | 12/1943 | Preble | 62/170 |
| 2,342,063 | 2/1944 | Sells et al. | 99/168 |
| 2,492,308 | 12/1949 | Menges | 99/194 |
| 2,531,506 | 11/1950 | Geneck | 62/89.5 |
| 2,533,913 | 12/1950 | Booth | 62/89.5 |
| 2,584,650 | 2/1952 | Woodruff | 126/113 |
| 2,625,806 | 1/1953 | Kennedy | 62/89.5 |
| 2,826,454 | 3/1958 | Coanda | 239/432 X |
| 3,130,024 | 4/1964 | Vaughan | 55/257.5 X |
| 3,280,887 | 10/1966 | Charurt et al. | 55/257.5 |
| 3,561,194 | 2/1971 | Baldwin et al. | 55/257.5 X |
| 3,563,472 | 2/1971 | Skaptason | 239/511 |
| 3,630,448 | 12/1971 | Chapin | 239/111 |
| 3,708,119 | 1/1973 | Vicard | 239/11 |
| 3,788,542 | 1/1974 | Mee | 239/2 |
| 3,843,056 | 10/1974 | Nye | 239/64 |
| 3,990,427 | 11/1976 | Clinebell | 126/113 |
| 4,179,900 | 12/1979 | Corrigan | 62/247 X |
| 4,738,806 | 4/1988 | Noma et al. | 261/81 |
| 4,808,303 | 2/1989 | Edwards et al. | 210/138 |

FOREIGN PATENT DOCUMENTS 3313399 10/1984 Fed. Rep. of Germany.
2119501 11/1983 United Kingdom.

*Primary Examiner*—William E. Tapolcai
*Attorney, Agent, or Firm*—Louis T. Isaf

[57] ABSTRACT

A discriminating humidification system for humidifying a controlled space which, in its most preferred embodiment, includes a control device connected to a water source for supplying water at a constant pressure, a tubing network for transferring water from the control device, a mist nozzle located within the controlled space and connected to the tubing network to receive water transferred from the control device, and a droplet discrimination device positioned around the mist nozzle and located within the controlled space for removing and draining larger water droplets from the mist sprayed from the mist nozzle for releasing a very fine water mist into the controlled space outside the droplet discrimination device.

49 Claims, 10 Drawing Sheets

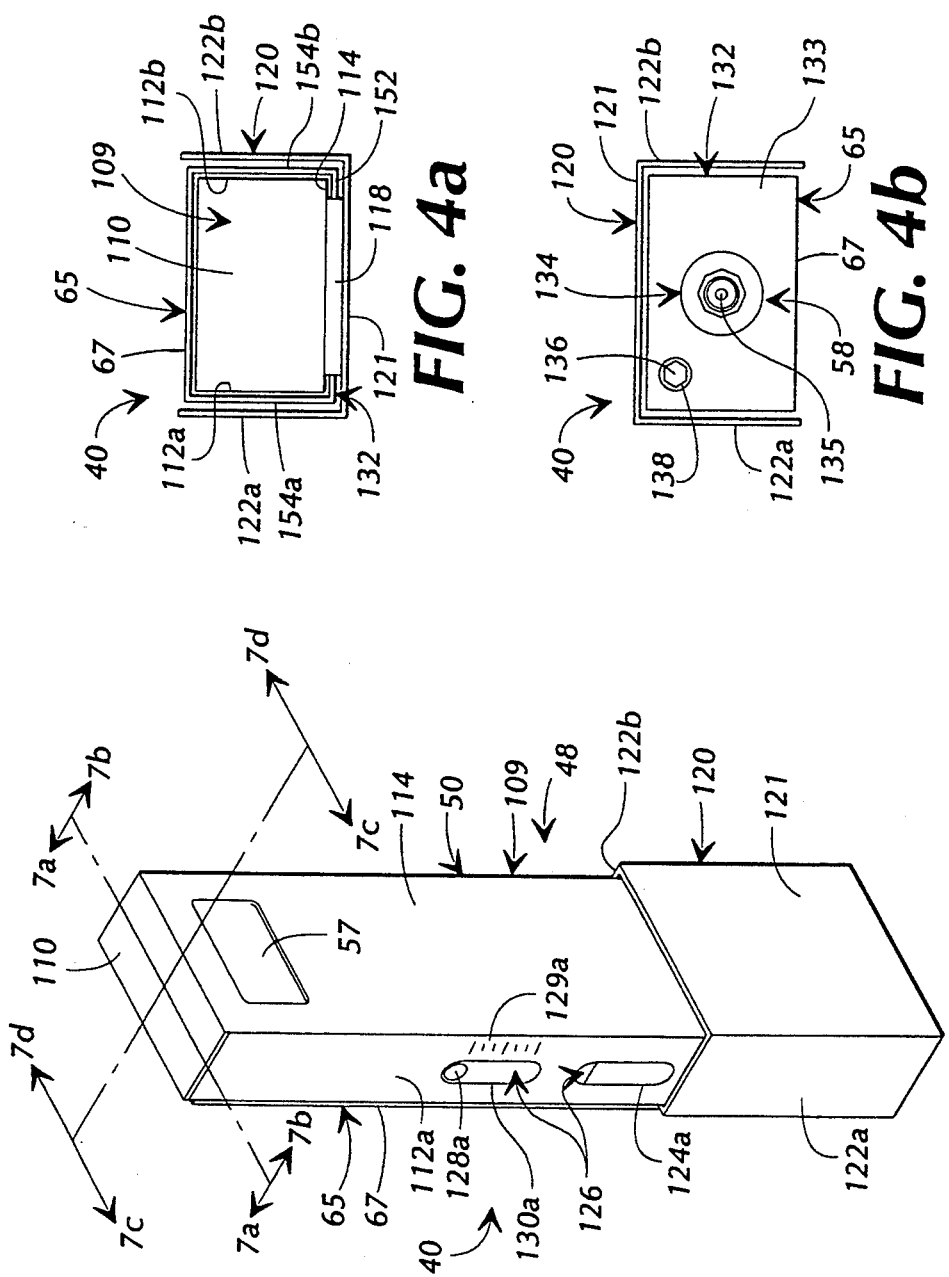

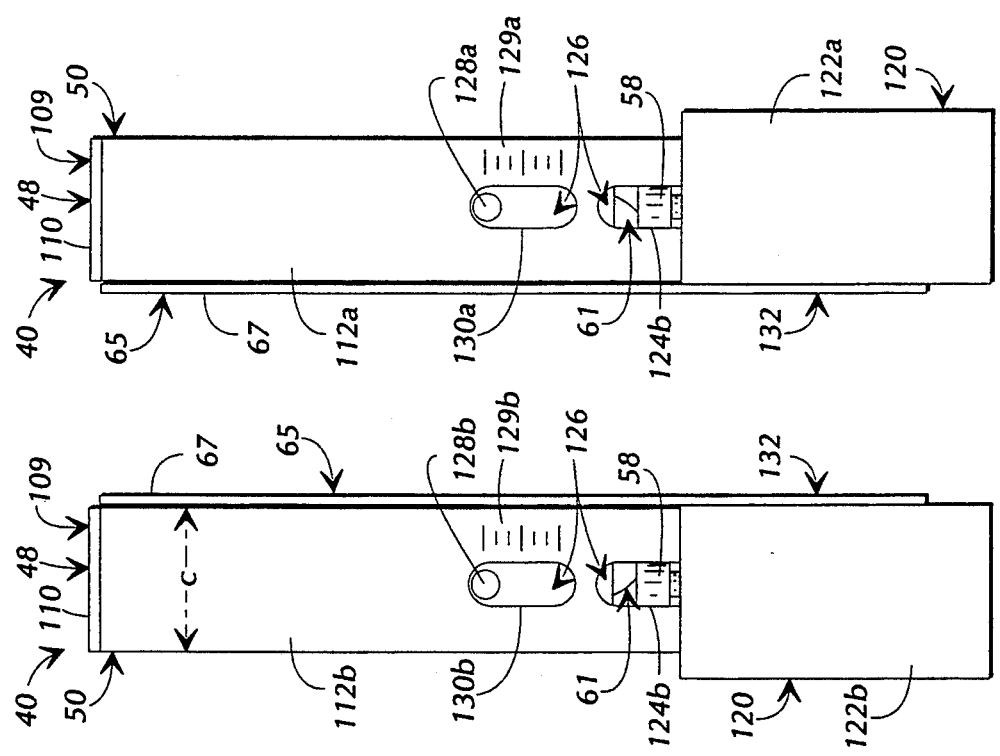
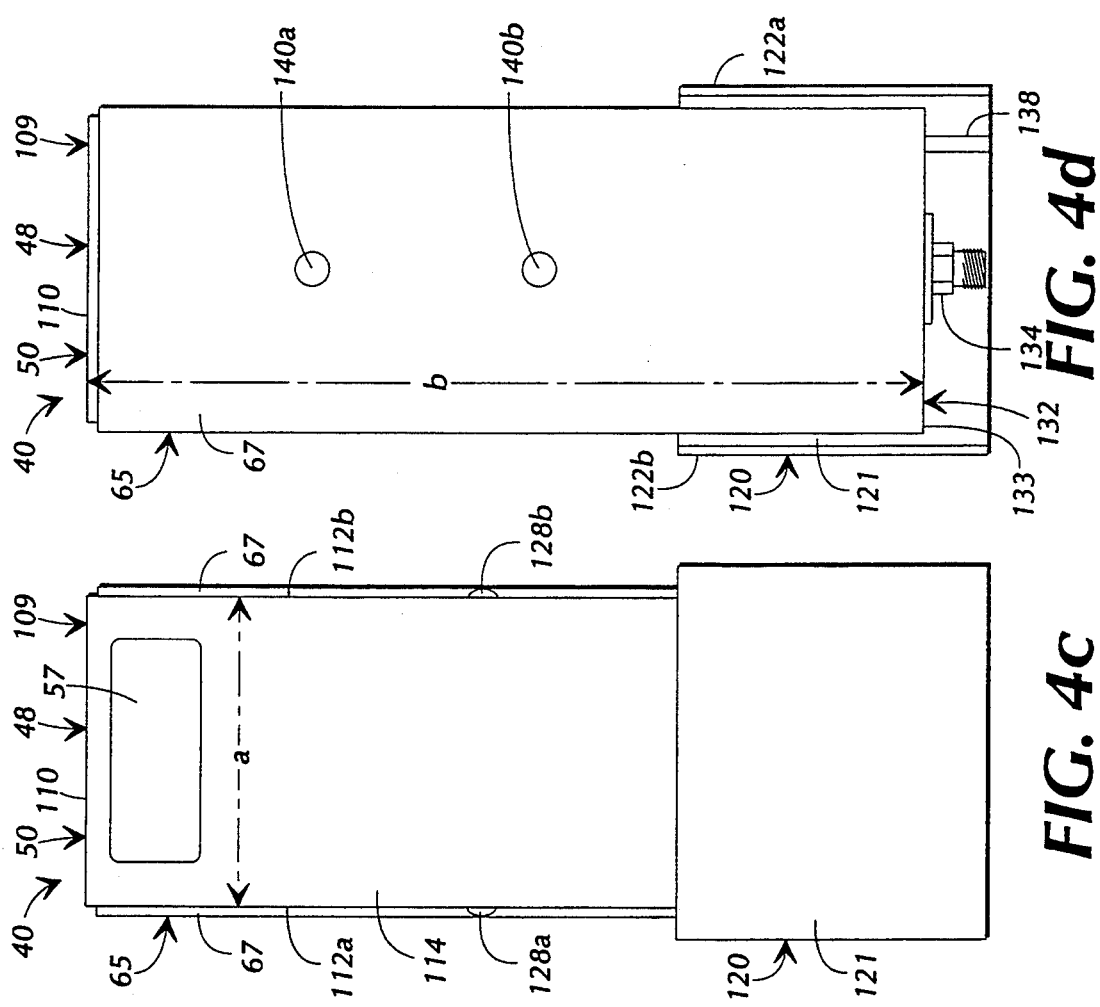
FIG. 4f  FIG. 4e  FIG. 4d  FIG. 4c

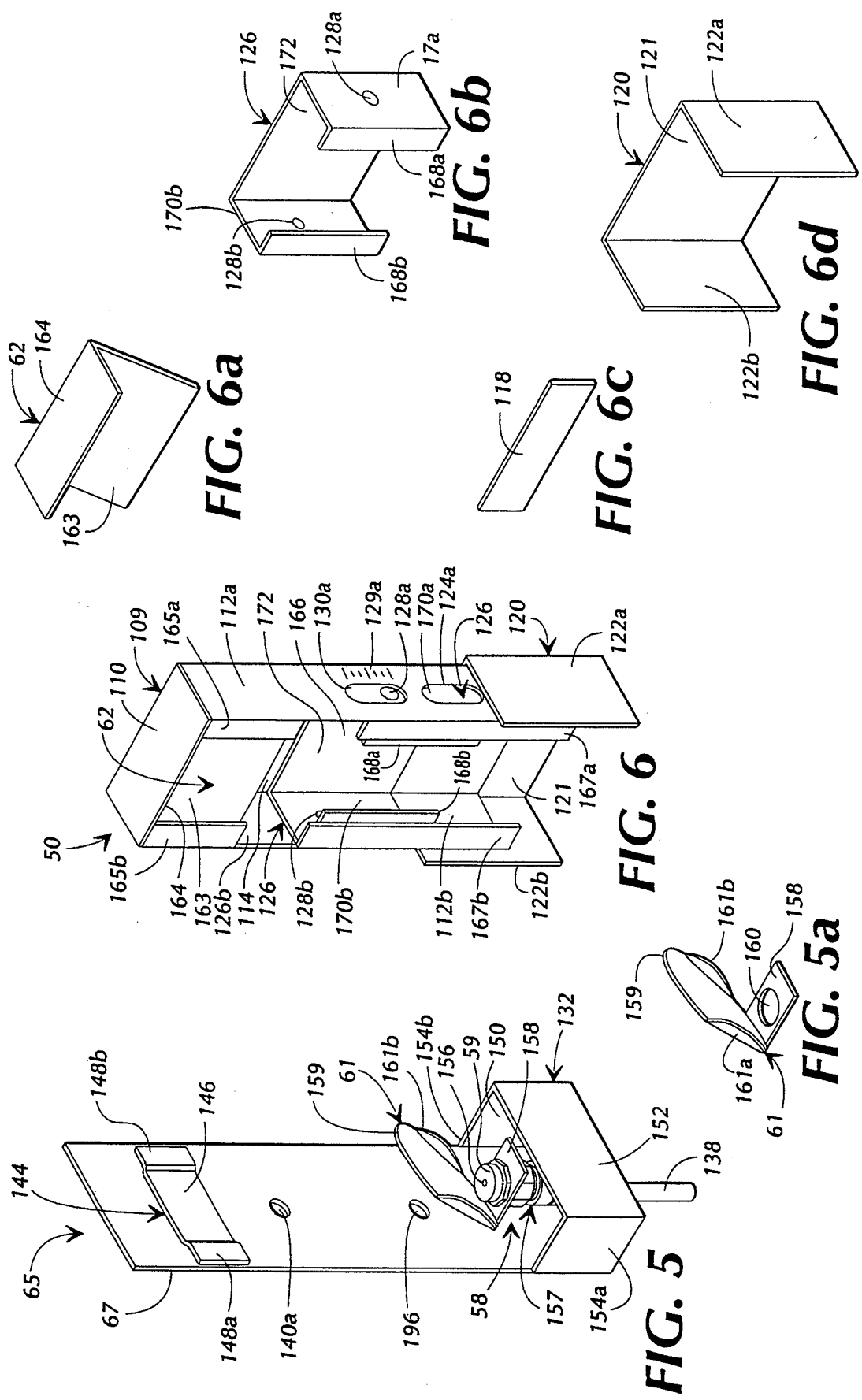

FIG. 7a   FIG. 7b   FIG. 7c   FIG. 7d

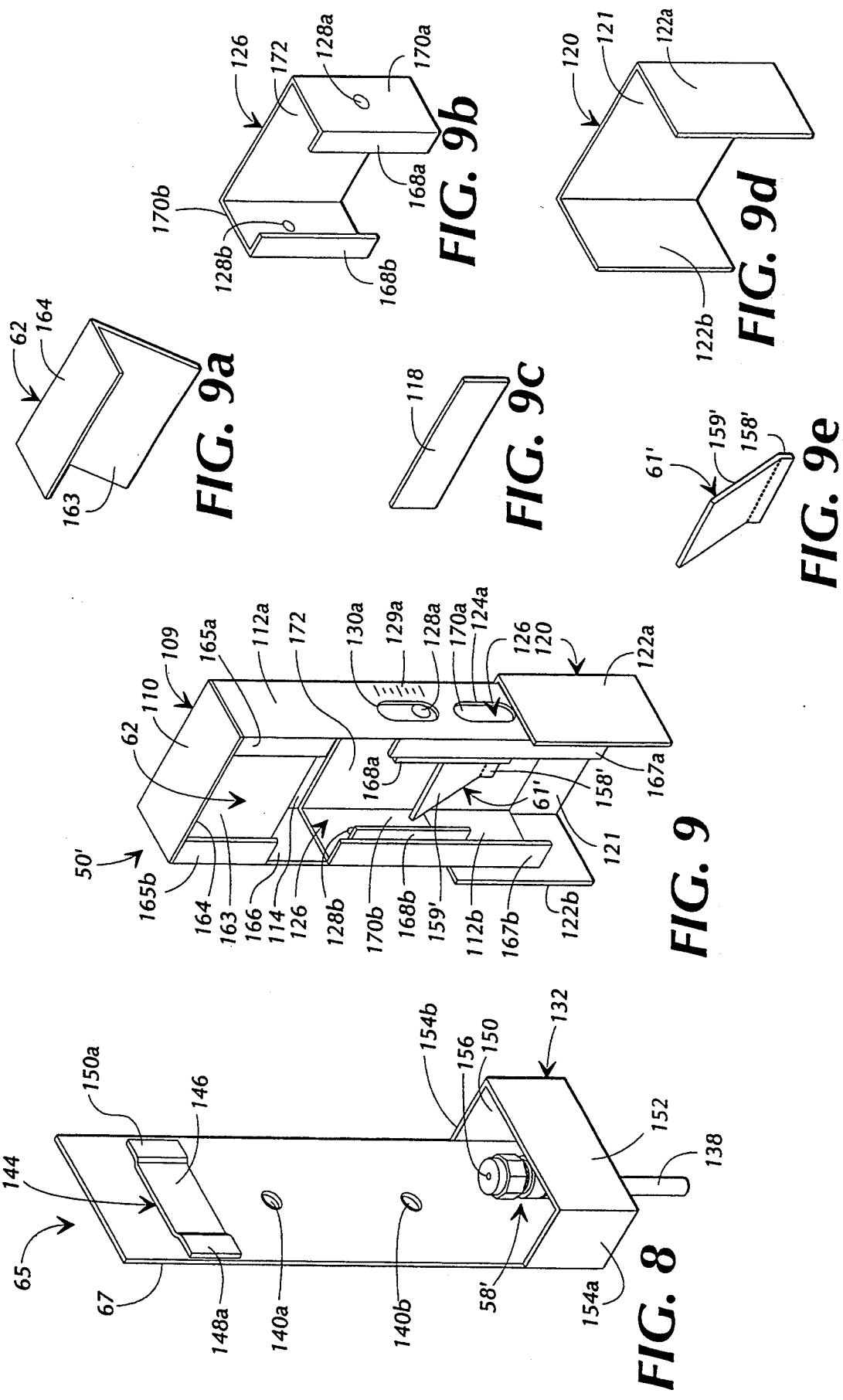

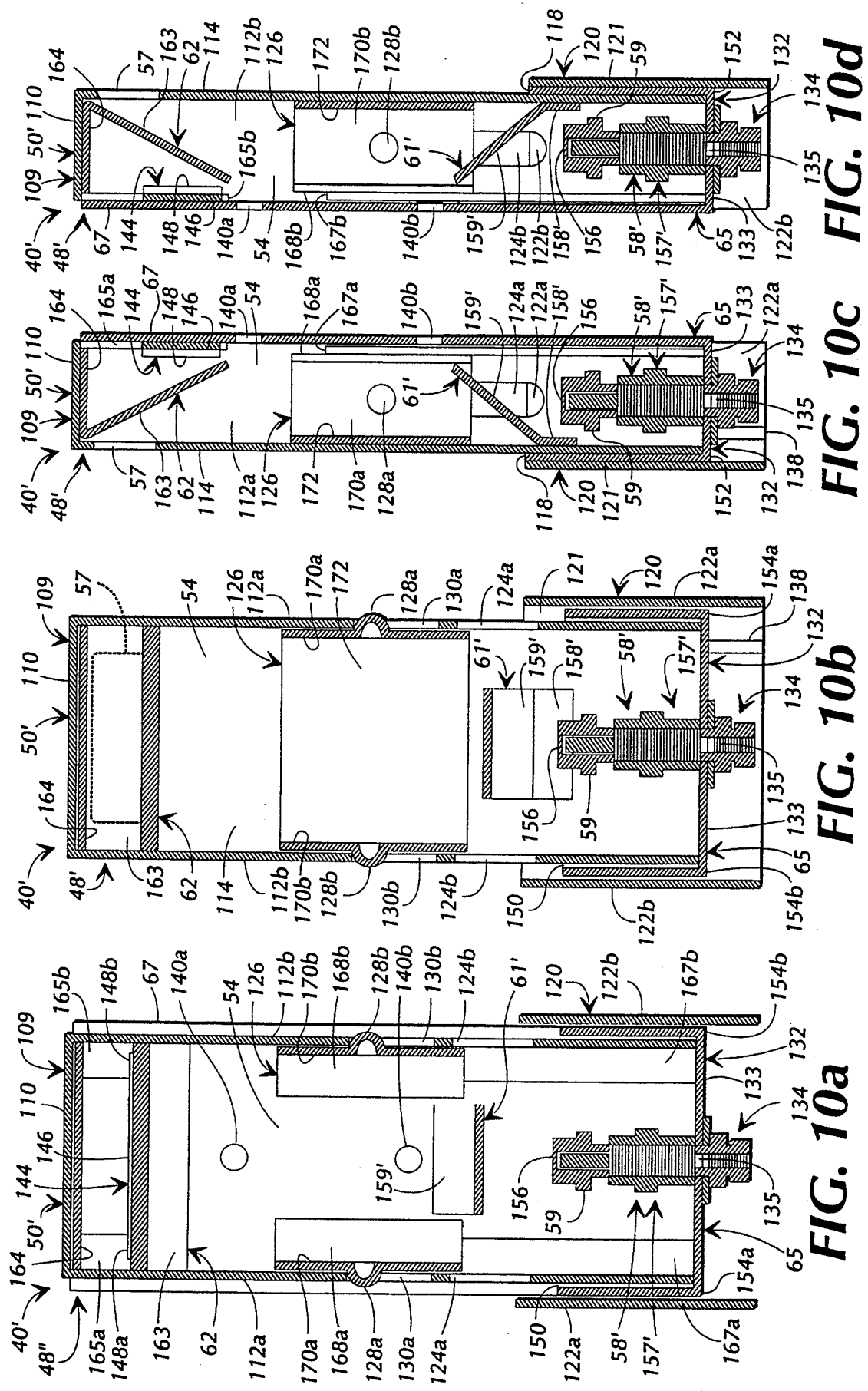

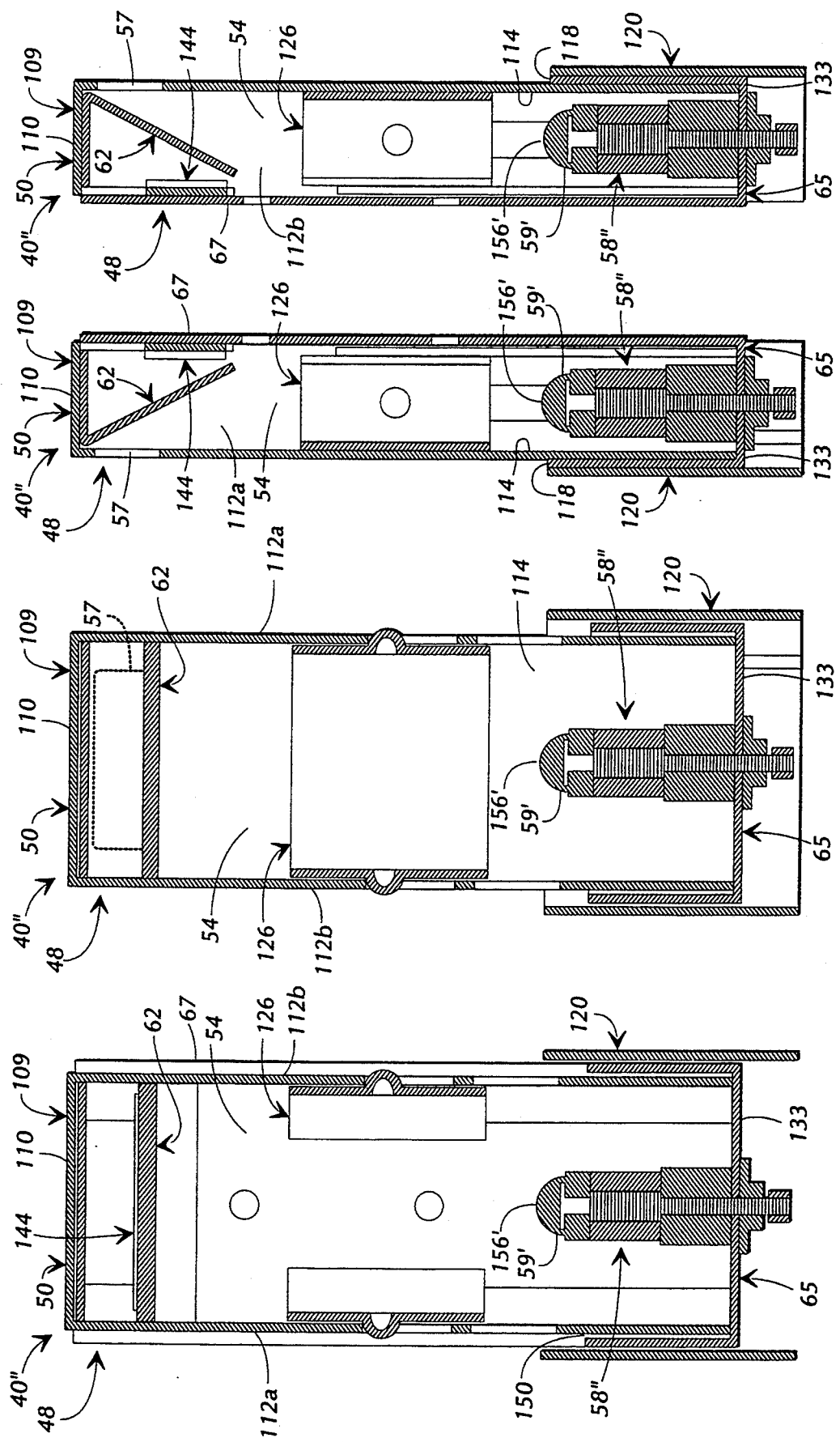

DISCRIMINATING HUMIDIFICATION SYSTEM

CROSS-REFERENCE TO RELATED APPLICATION

This application is a continuation-in-part of application Ser. No. 07/830,190, filed Jan. 31, 1992, allowed Sep. 9, 1992 as U.S. Pat. No. 5,193,354.

BACKGROUND OF THE INVENTION

The present invention relates generally to the field of humidity control, and, in its most preferred embodiments, to the field of mist producing humidification systems for enclosed refrigerated environments.

Refrigeration system have existed for many years, and the preservation benefits of refrigeration systems are very well known. Equally well known is the tendency of refrigeration systems to extract moisture from the cooled air. As a result, refrigerated perishables, such as meats, fish, salads, flowers, and other products, often dry out and deteriorate in refrigerated display cases. In the past, various efforts have been made to increase humidity levels in refrigerated air. U.S. Pat. Nos. 2,281,458, 4,738,806, 2,531,506, and 2,097,530 disclose several systems claiming to increase humidity levels in refrigerated air.

It is also understood that although increasing the amount of humidity in refrigerated air can often reduce dehydration of refrigerated perishables, an overabundance of moisture can cause other problems. Humidification systems which produce excessively humid air or, worse yet, spray moisture directly onto refrigerated perishables can cause certain refrigerated perishables to deteriorate more rapidly or become unsaleable.

Systems which supply a very fine mist into the refrigerated air are preferable since very small droplets of water tend to evaporate quickly rather than settle and collect on the refrigerated perishables. Many previously developed humidifier systems which produce very fine mists are very complex in construction, operation, and maintenance. Furthermore, many of those systems lend themselves to contamination problems due to incorporation of standing water and various air atomization techniques. Still other systems are difficult or cumbersome to control with precision and/or are adversely affected by changing environmental factors.

There is, therefore, a need in the industry for a humidification system which addresses these and other related, and unrelated, problems.

SUMMARY OF THE INVENTION

Briefly described, the present invention comprises a discriminating humidification system for, in its most preferred embodiment, humidifying a controlled space and includes a control device connected to a water source for supplying water at constant pressures for pre-determined cycle periods, a tubing network for transferring pressurized water from the control device, a mist nozzle located within the controlled space and connected to the tubing network to receive pressurized water transferred from the control device, a first baffle device connected to the mist nozzle, and a droplet discrimination device positioned around the mist nozzle and the first baffle device and located within the controlled space for removing and draining larger water droplets from the mist sprayed from the mist nozzle for releasing a very fine mist into the controlled space outside the droplet discrimination device.

In the preferred embodiment of the present invention, the droplet discrimination device includes a base portion including mounting apertures for attachment to a support structure and a sleeve portion connected only to the base portion and defining a mist chamber, an air outlet, and two air inlets separated by the mist chamber. The sleeve portion further includes an adjustment slide for adjusting the sizes of the air inlets. A second baffle structure is also included for, along with the first baffle structure, affecting, through size, shape, orientation, and location, the quality of mist exiting the air outlet. The base portion further defines a supply aperture for connection to the mist nozzle and a drainage aperture for connection to a drainage coupling.

It is therefore an object of the present invention to provide a humidification system for humidifying a controlled space through releasing a very fine mist into the controlled space.

Yet another object of the present invention is to provide a humidification system which is easy to install and maintain in both pre-existing and new refrigerated cases.

Still another object of the present invention is to provide a humidification system which is sanitary and free from contamination problems related to standing water and various air atomization techniques.

Still another object of the present invention is to provide a humidification system which introduces mist into a controlled space in such a form and at such a controlled rate that air within the space remains humid while moisture does not settle on perishables.

Still another object of the present invention is to provide a humidification system which includes a control device connected to a water supply, which control device includes a filter, a high pressure pump, a feedback regulator network for providing constant water pressure, and a timer for controlling misting cycles.

Still another object of the present invention is to provide a humidification system which includes a mist nozzle which emits a mist of separate droplets and a droplet discrimination device which sorts the droplets of the mist emitted from the mist nozzle to sort out and drain larger droplets to release a refined mist.

Still another object of the present invention is to provide a humidification system which includes a mist nozzle and a droplet discrimination device which are both removably located within the refrigerated space of a refrigerated case.

Still another object of the present invention is to provide a humidification system which includes a mist nozzle with a nozzle output orifice for emission of a mist and a droplet discrimination device which defines a mist chamber around the nozzle output orifice, the mist and air in the mist chamber being moved primarily in response to force from the mist emitted from the mist nozzle.

Still another object of the present invention is to provide a humidification system which includes a mist nozzle with a nozzle output orifice for emission of a mist and a droplet discrimination device which defines a mist chamber around the nozzle output orifice, the mist and air in the mist chamber being primarily pushed, rather than pulled, through the mist chamber.

Still another object of the present invention is to provide a humidification system which includes a mist nozzle with a nozzle output orifice and a droplet discrimination device which completely encloses the nozzle output orifice with the only exception of at least one release aperture located above the nozzle output orifice.

Still another object of the present invention is to provide a misting assembly which defines a mist chamber and includes adjustable air inlets and at least one baffle located within the mist chamber.

Still another object of the present invention is to provide a misting assembly which is simple in construction and relatively small in size.

Other objects, features and advantages of the present invention will become apparent upon reading and understanding this specification, taken in conjunction with the accompanying drawings.

BRIEF DESCRIPTION OF THE DRAWINGS

FIG. 4 is front perspective view of the misting assembly of FIG. 2, showing an adjustment slide of the misting assembly in a fully open position.

FIG. 4a is a top view of the misting assembly of FIG. 4.

FIG. 4b is a bottom view of the misting assembly of FIG. 4.

FIG. 4c is a front view of the misting assembly of FIG. 4.

FIG. 4d is a rear view of the misting assembly of FIG. 4.

FIG. 4e is a right side view of the misting assembly of FIG. 4.

FIG. 4f is a left side view of the misting assembly of FIG. 4.

FIG. 5 is a front perspective view of the base portion, nozzle assembly, and primary baffle of the misting assembly of FIG. 4.

FIG. 5a is an isolated front perspective view of the primary baffle of FIG. 5.

FIG. 6 is a rear perspective view of the sleeve portion of FIG. 4, showing the adjustment slide of the misting assembly in a fully closed position.

FIG. 6a is an isolated rear perspective view of the secondary baffle of FIG. 6.

FIG. 6b is an isolated rear perspective view of the adjustment slide of FIG. 6.

FIG. 6c is an isolated rear perspective view of the skirt spacer included, but hidden, in the sleeve portion of FIG. 6.

FIG. 6d is an isolated rear perspective view of the sleeve skirt of FIG. 6.

FIG. 7a is a front cross-sectional view of the misting assembly taken along line 7a—7a of FIG. 4.

FIG. 7b is a rear cross-sectional view of the misting assembly taken along line 7b—7b of FIG. 4.

FIG. 7c is a right cross-sectional side view of the misting assembly taken along line 7c—7c of FIG. 4.

FIG. 7d is a left cross-sectional side view of the misting assembly taken along line 7d—7d of FIG. 4.

FIG. 8 is a front perspective view of a base portion and a nozzle assembly of a misting assembly in accordance with an alternate embodiment of the present invention.

FIG. 9 is a rear perspective view of a sleeve portion of a misting assembly in accordance with the alternate embodiment of FIG. 8, showing the adjustment slide of the misting assembly in a fully closed position.

FIG. 9a is an isolated rear perspective view of the secondary baffle of FIG. 9.

FIG. 9b is an isolated rear perspective view of the adjustment slide of FIG. 9.

FIG. 9c is an isolated rear perspective view of the skirt spacer of included, but hidden, in the sleeve portion of FIG. 9.

FIG. 9d is an isolated rear perspective view of the sleeve skirt FIG. 9.

FIG. 9e is an isolated rear perspective view of the primary baffle of FIG. 9.

FIGS. 10a–10d are cross-sectional views similar to FIGS. 7a–7d of a misting assembly in accordance with the alternate embodiment of FIGS. 8-9e.

FIGS. 11a–11d are cross-sectional views similar to FIGS. 7a–7d of a misting assembly in accordance with another alternate embodiment of the present invention.

DETAILED DESCRIPTION OF THE PREFERRED EMBODIMENT

Figure 1:
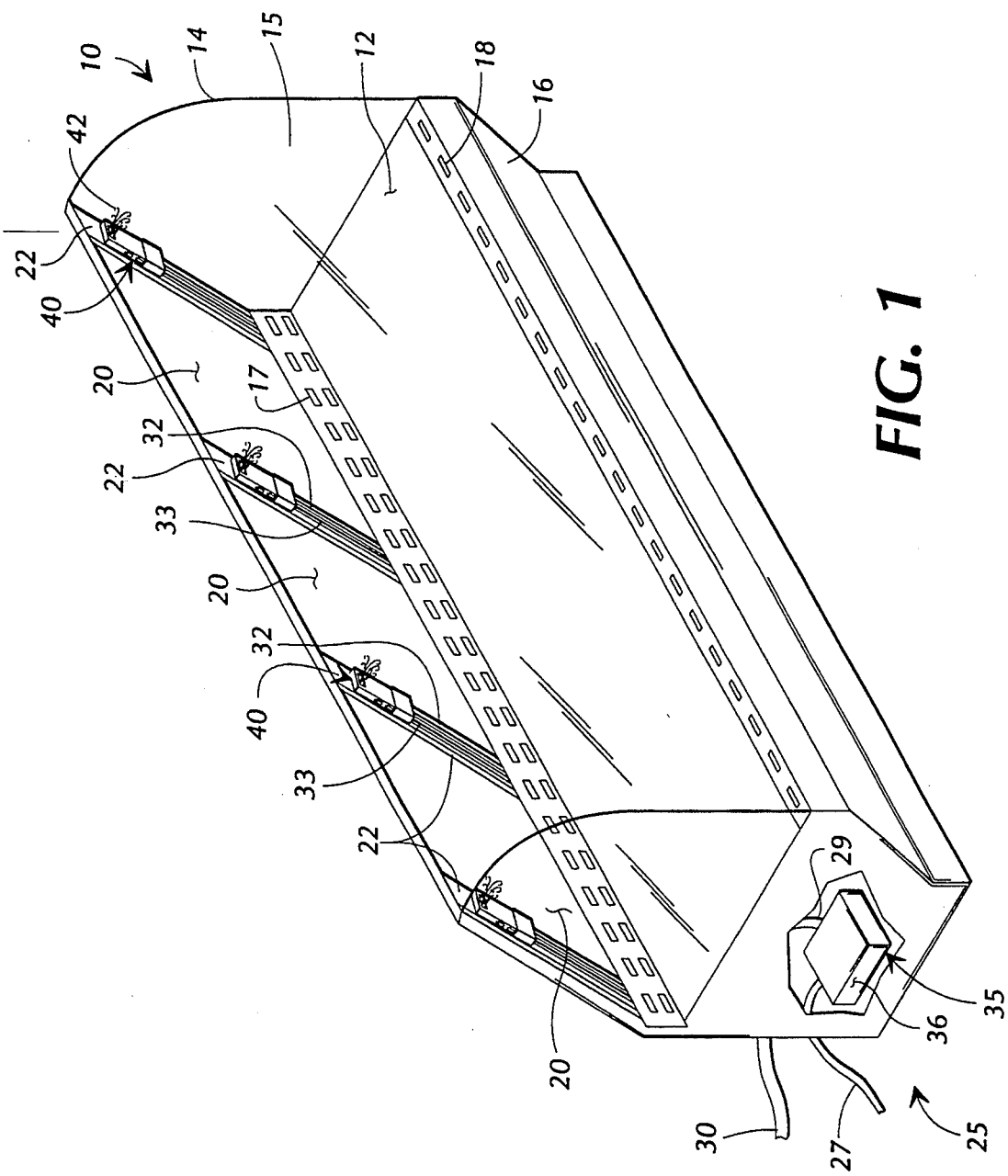
FIG. 1 is a front perspective view of a refrigerated case equipped with a discriminating humidification system, in accordance with a preferred embodiment of the present invention.

Referring now in greater detail to the drawings, in which like numerals represent like components throughout the several views, and in accordance with the preferred embodiment of the present invention, a refrigerated case 10 with a discriminating humidification system 25 is shown in FIG. 1. The refrigerated case 10 includes a case base 16 supporting a display surface 12. The display surface 12 is located within a refrigerated space 15 which is enclosed by a glass hood 14 and sliding doors 20 which are supported by support posts 22. Refrigeration outlets 17 circulate cool air into the refrigerated space 15, and refrigeration intakes 18 remove air from the refrigerated space 15 to be refrigerated and returned through the refrigeration outlets 17.

Enclosed within the case base 16 is a customary, forced-air refrigeration system (not shown) whose design and operation are considered well-known within the industry. One example of an acceptable refrigerated case 10 is the LCD model manufactured by Tyler Refrigeration Corporation of Niles, Mich. It should be understood that the particular refrigerated case 10 shown in FIG. 1 is shown by way of example only, and that alternately designed refrigerated cases 10 are included in alternate embodiments of the present invention. In one alternate embodiment, a gravity case is utilized which includes cooling coils supported in the upper portion of the refrigerated case 10, thus utilizing convection currents to circulate the cool air. Without limitation, other embodiments include display surfaces 12 which include grated platforms and draining formations for disposing of juices and other droppings from perishables displayed in the refrigerated case 10. In other alternate embodiments of the present invention, refrigerated cases 10 have refrigerated spaces which are not completely enclosed. Furthermore, other alternate embodiments include cases which are cooled with ice rather than refrigeration systems, and still others include cases which are heated, rather than cooled. In still other embodiments, the controlled spaces are neither heated nor cooled but simply need increases in humidity for various purposes.

In accordance with the preferred embodiment of the present invention, the discriminating humidification system 25 shown in FIG. 1 includes a tap supply hose 27 connected to a water supply, such as a utility water outlet (not shown). Connected to the tap supply hose 27 is a control assembly 35 which is encased by a protective control box 36 and mounted inside the case base 16. In alternate embodiments of the present invention, the control assembly 35 is mounted outside the refrigerated case 10. A supply main 29, shown leading from the control assembly 35, connects the control assembly 35, through conventional tubing connectors, to a plurality of supply tubes 32. Each of the supply tubes 32 is connected to a misting assembly 40, each of which is supported by a support post 22 of the refrigerated case 10 and emits a fine mist 42 into the refrigerated space 15. A plurality of drain tubes 33 lead away from the plurality of mist assemblies 40 to connections with a drain main 30 which leads away from the refrigerated case 10 to a standard drainage or sewage system. All of the humidification system tubing elements 27, 29, 30, 32, 33 running through the refrigerated case 10 are positioned clear from cold refrigeration elements to prevent freezing of water within the tubing elements.

It should be understood that the scope of the present invention includes, consistent with the teachings and objects of the present invention, variations in the number, locations, and orientations of the misting assemblies 40 (and associated supply and drain tubes 32, 33) depending on the size and shape of the refrigerated case 10, as well as other environmental considerations including the types of perishables and placement of the refrigerated case 10. For example, in alternate embodiments, the misting assemblies 40 are mounted on the display surface 12 or angled in alternate directions. With respect to alternate embodiments including alternate cases, the misting assemblies 40 are mounted to various surfaces, including side walls and ceilings.

Figure 2:
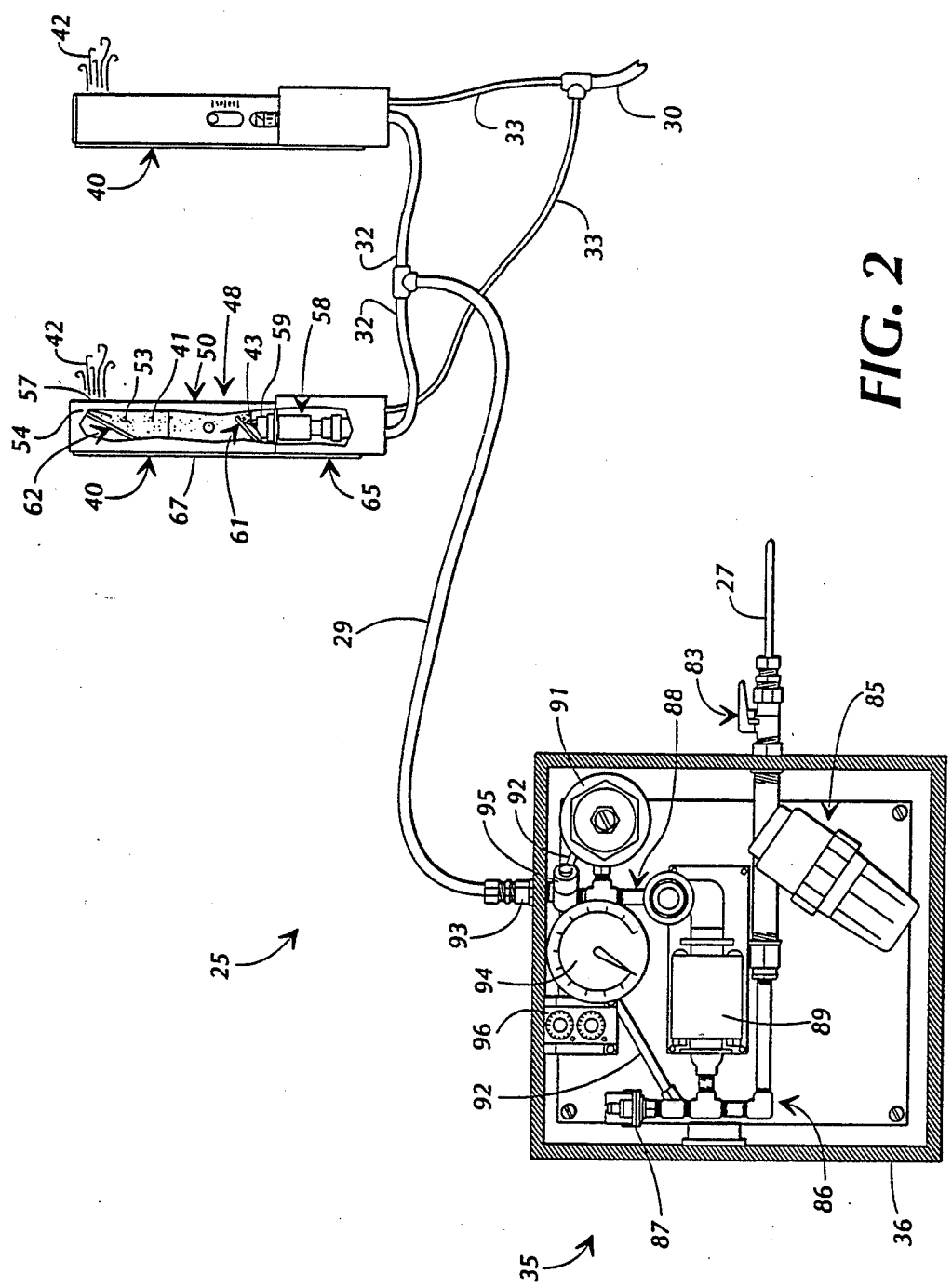
FIG. 2 is a schematic view of the humidification system of FIG. 1, showing left side views of misting assemblies, one view of which is a cut-away view.

Refer now to the schematic representation of the discriminating humidification system 25 shown in FIG. 2. The control assembly 35 is shown connected to the misting assemblies 40 through the supply main 29 and supply tubes 32. The drain tubes 33 and drain main 30 are also seen leading away from the misting assemblies 40. In the preferred embodiment of the present invention, the misting assemblies 40 are identical; therefore, although the following description is given in terms of a single misting assembly 40, the description should be understood to apply to each of the misting assemblies 40. In accordance with the preferred embodiment of the present invention, the misting assembly 40 includes a discriminator 48 housing a nozzle assembly 58 and a primary baffle 61 connected to the nozzle assembly 58. In the preferred embodiment, the discriminator 48 includes a base portion 65 and a sleeve portion 50. The base portion 65 includes a mounting plate 67 for removably securing the misting assembly 40 to a support post 22 (shown in FIG. 1). In the preferred embodiment of the present invention, the sleeve portion 50 is removably connected to the base portion 65.

In the preferred embodiment of the present invention, the sleeve portion 50 and base portion 65 of the discriminator 48 cooperate to define a mist chamber 54. A nozzle mist 43 is shown being emitted from a mist nozzle 59 of the nozzle assembly 58. The nozzle mist 43 is shown contacting the primary baffle 61 and subsequently developing into a mid-chamber mist 41 as the mist moves through the mist chamber 54 of the discriminator 48. As the mist continues to move through the mist chamber 54, the mist contacts a secondary baffle 62 before it is finally released as the fine mist 42 through a release aperture 57 defined through the sleeve portion 50.

The control box 36 of the control assembly 35 is shown open to reveal other elements of the control assembly 35 in accordance with the preferred embodiment of the present invention. Tap supply hose 27 is connected to an intake valve assembly 83 which is connected to the control box 36. Connected down-line from the intake valve assembly 83 and located inside the control box 36 is a filter 85. Pre-pump tubing 86 connects the filter 85 to a high pressure pump 89, a supply indicator 87, and a feedback line 92. Post-pump tubing 88 connects the pump 89 to a pressure gauge 94, a pressure regulator 91 which is connected to the feedback line 92, and a control solenoid 95. A supply coupling assembly 93 is connected to the control box 36 and connects the control solenoid 95 to the supply main 29. A timer 96 is also shown mounted within the control box 36.

Figure 3:
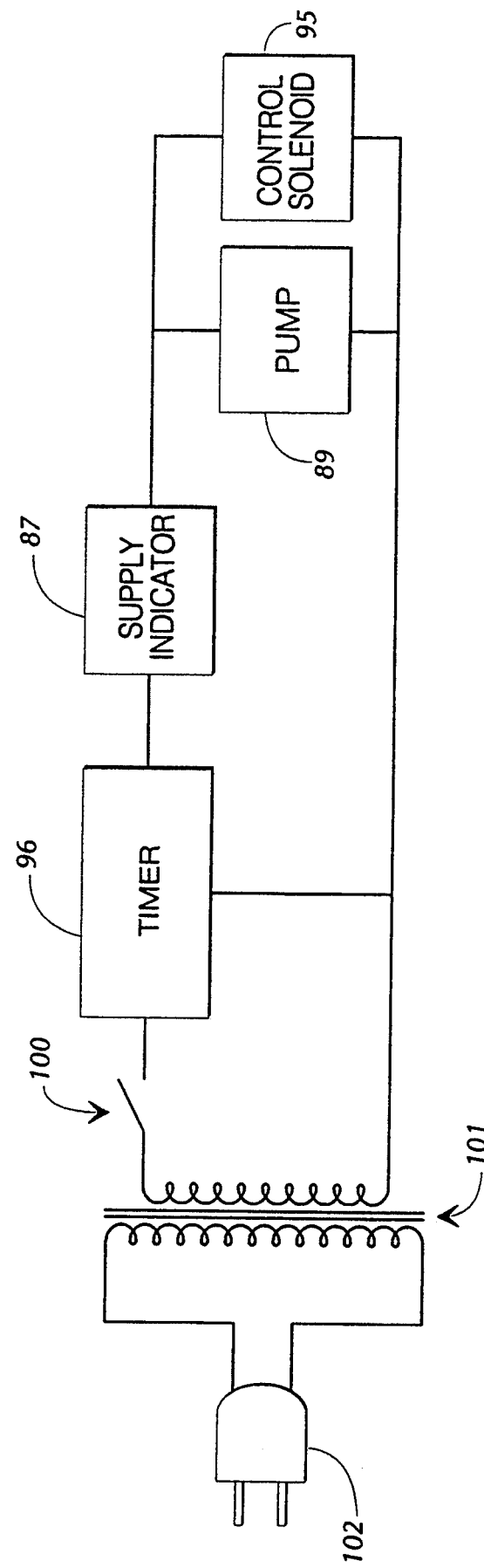
FIG. 3 is an electrical schematic of the control assembly of FIG. 2.

Referring now to FIG. 3, an electrical schematic of the control assembly 35 in accordance with the preferred embodiment of the present invention, an AC plug 102 is shown connected to a transformer 101 which, in the preferred embodiment of the present invention, transforms 110 VAC to 24 VAC. An on-off switch 100 is located between the transformer 101 and the timer 96. The supply indicator 87 is shown connecting the timer 96 to both the high pressure pump 89 and the control solenoid 95. Operation of the control assembly 35 is discussed in detail below.

Referring now to FIG. 4, which shows a front perspective view of the misting assembly 40, in accordance with the preferred embodiment of the present invention, the sleeve portion 50 is connected to the base portion 65 which is shown including the mounting plate 67. The sleeve portion 50 is shown including a sleeve body 109 and a sleeve skirt 120. The sleeve body 109 includes a body top panel 110, two body side panels 112a and 112b, (112b being hidden from view) and a body front panel 114. The sleeve skirt 120 includes a skirt front panel 121 and two skirt side panels 122a,b. The release aperture 57 is shown defined through the body front panel 114. An air inlet 124a and a knob aperture 130a are shown defined through the body side panel 112a. Similar openings 124b and 130b are defined through the body side panel 112b (hidden from view). An adjustment slide 126 is shown located inside the sleeve portion 50 behind the air inlet 124a and the knob aperture 130a. A slide knob 128a is shown protruding through the knob aperture 130a. A similar slide knob 128b protrudes through the knob aperture 130b (hidden from view). Knob indicia 129a are located on the body side panel 112a adjacent the knob aperture 130a. Similar indicia are located on the body side panel 112b (hidden from view).

Referring now to FIG. 4a, which shows a top view of the misting assembly 40 of FIG. 4, the body front panel 114 of the sleeve body 109 is connected through a skirt spacer 118 to the skirt front panel 121 of the sleeve skirt 120. The skirt side panels 122a,b are shown held out and away from the body side panels 112a,b. The base portion 65 is shown including a base basket 132 connected to the mounting plate 67 and located between the sleeve body 109 and the sleeve skirt 120. The base basket 132 is shown including a basket front panel 152 and basket side panels 154a,b.

FIG. 4b, a bottom view of the misting assembly 40 of FIG. 4, shows the base basket 132 further including a basket floor 133, through which is defined a drainage aperture 136 and a supply aperture 135. A drainage coupling 138 is shown attached to the drainage aperture 136. A supply coupling 134 of the nozzle assembly 58 is connected to the supply aperture 135.

Referring now to FIG. 4c, which shows a front view of the misting assembly 40 of FIG. 4, the mounting plate 67 of the base portion 65 is shown located behind the sleeve body 109 and the sleeve skirt 120 of the sleeve portion 50. The release aperture 57 is shown defined through the body front panel 114. The slide knobs 128a,b are shown extending out from the body side panels 112a,b. A width measurement, indicated as dimension "a", denotes the width of the body front panel 114, and thus the width of the mist chamber 54 (FIG. 2) defined by the discriminator 48. According to the preferred embodiment of the present invention, one example of an acceptable width "a" is 2 inches.

FIG. 4d, a rear view of the misting assembly 40 of FIG. 4, shows the mounting panel 67 of the base portion 65 located in front of the sleeve body 109 and the sleeve skirt 120 of the sleeve portion 50. Two mounting passages 140a,b are shown defined through the mounting plate 67. The skirt front panel 121 and skirt side panels 122 of the sleeve skirt 120 are shown located around the base basket 132 of the base portion 65. The supply coupling 134 and drainage coupling 138 are shown extending downward from the basket floor 133 of the base basket 132. A height measurement, indicated as dimension "b", denotes the height of the mist chamber 54 (FIG. 2) defined by the discriminator 48. According to the preferred embodiment of the present invention, one example of an acceptable height "b" is 7 inches.

FIG. 4e, a right side view of the misting assembly 40, shows the knob aperture 130b and the air inlet 124b defined through the body side panel 112b. The knob indicia 129b are shown located adjacent the knob aperture 130b, and the slide knob 128b of the adjustment slide 126 is shown protruding through the knob aperture 130b. The bottom of the adjustment slide 126 is shown behind the air inlet 124b, which extends partially below the top of the skirt side panel 122b. A portion of the primary baffle 61 is shown located inside the discriminator 48. A depth measurement, indicated as dimension "c", denotes the depth of the mist chamber 54 (FIG. 2) defined by the discriminator 48. According to the preferred embodiment of the present invention, one example of an acceptable depth "c" is 1 inch. FIG. 4f is a left side view of the misting assembly 40 and shows many similar and reciprocal elements of FIG. 4e.

Referring now to FIG. 5, which shows a front perspective view of the base portion 65 and the primary baffle 61, in accordance with the preferred embodiment of the present invention, the base basket 132 is shown extending out from the mounting plate 67. The mounting passages 140a,b are shown extending through the mounting plate 67. A base clip 144 is shown connected to the mounting plate 67. The base clip 144 includes a clip foot 146 attached to the mounting plate 67 and two clip arms 148a,b extending away from the clip foot 146 and the mounting plate 67 as shown in FIG. 5.

The basket front panel 152, the basket side panels 154a,b, and the mounting plate 67 are shown defining a basket cavity 150. The nozzle assembly 58 is shown located partially within the basket cavity 150. The mist nozzle 59 of the nozzle assembly 58 defines a nozzle orifice 156 and is connected to the base portion 65 and the supply coupling 134 (FIG. 4d) through a nozzle coupling assembly 157. The primary baffle 61 is also shown connected to the nozzle assembly 58. The primary baffle 61, shown in an isolated front perspective view in FIG. 5a, includes a primary baffle base 158 and a primary baffle deflector 159. The primary baffle base includes a primary baffle portal 160 for connection between the mist nozzle 59 and the nozzle coupling assembly 157. In the preferred embodiment, the primary baffle deflector 159 is substantially circular and angled upward away from the nozzle assembly 58. Two deflector rims 161a and 161b depend from the primary baffle deflector 159 and extend toward each other under the primary baffle deflector 159.

FIG. 6 is a rear perspective view of the sleeve portion 50, in accordance with the preferred embodiment of the present invention, showing the adjustment slide 126 in a fully closed position. The sleeve body 109 and the sleeve skirt 120 (shown in isolation in FIG. 6d) are shown connected together. As discussed above, the sleeve body 109 is connected to the sleeve skirt 120 through the skirt spacer 118 (hidden from view in FIG. 6, but shown in isolation in FIG. 6c and in use in FIG. 4a). The body top panel 110, body side panels 112a,b, and body front panel 114 are shown connected together. A secondary baffle 62 is shown located within the sleeve body 109 and connected to the body top panel 110. The secondary baffle 62 is shown in isolation in FIG. 6a and includes a secondary baffle deflector 163 and a secondary baffle base 164 which is connected to the body top panel 110.

Two clip rails 165a,b are shown extending from the body side panels 112a,b. Two slide rails 167a,b are also shown extending from the body side panels 112a,b and separated from the clip rails 165a,b by a clip gap 166. The adjustment slide 126 is shown located between the slide rails 167a,b, the body front panel 114, and the body side panels 112a,b. The adjustment slide 126, which is shown in isolation in FIG. 6b, includes two slide braces 168a,b which slidingly contact the slide rails 167 of the sleeve body 109, two slide sides 170a,b which slidingly contact the body side panels 112a,b, and a slide front 172 which slidingly contacts the body front panel 114.

Figures 7A, 7B, 7C, 7D:
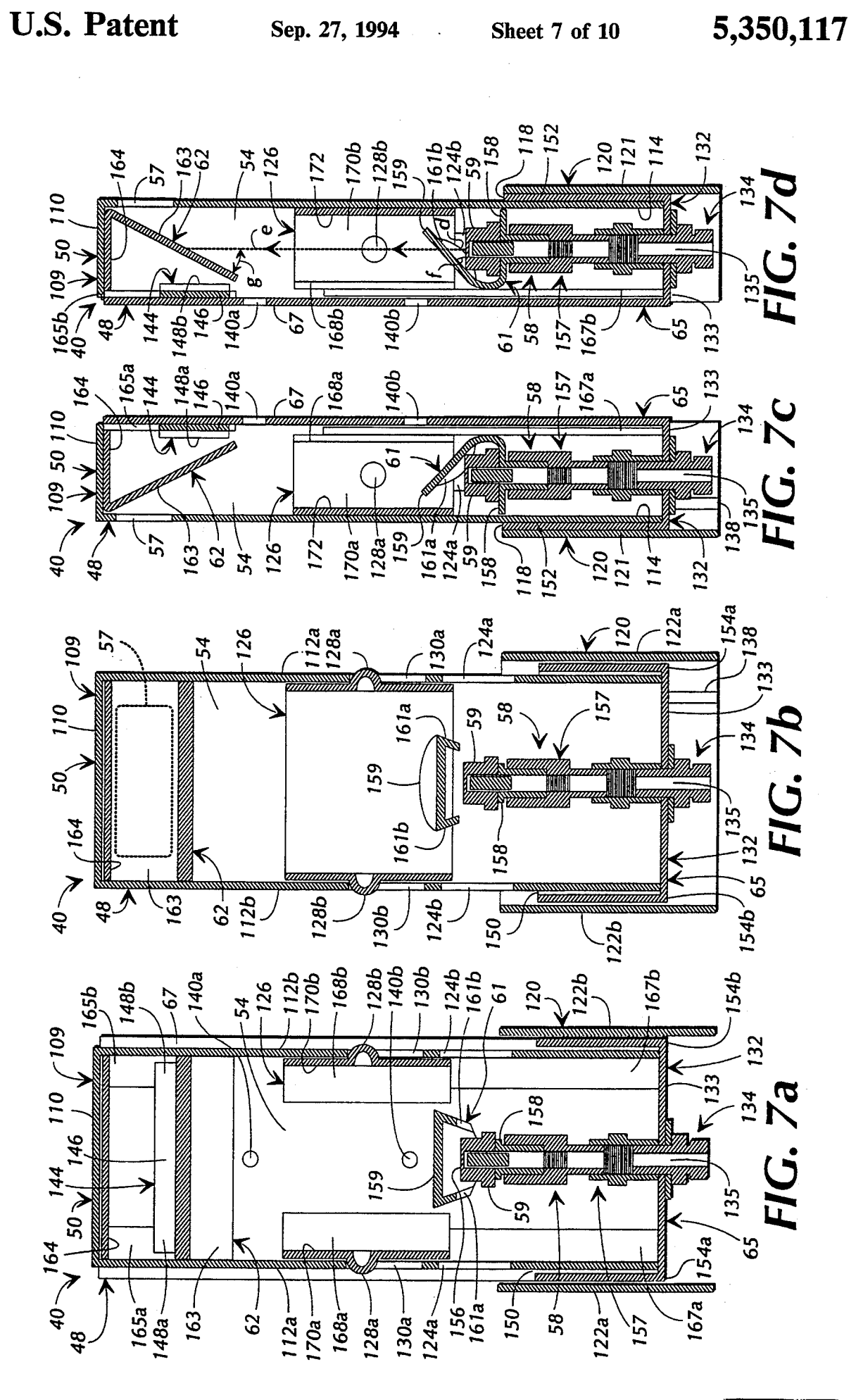

Refer now to FIG. 7a, which shows a front cross-sectional view of the misting assembly 40 taken along line 7a—7a of FIG. 4. The discriminator 48 is shown defining a mist chamber 54 around the nozzle assembly 58 and the primary baffle 61. The sleeve body 109 is shown situated within the basket cavity 150 defined by the base basket 132 so that the body side panels 112a,b and the slide rails 167a,b contact the basket floor 133. The basket side panels 154a,b are shown located between the body side panel 112a,b and the skirt side panels 122a,b of the sleeve skirt 120. The primary baffle 61 is shown connected to the nozzle assembly 58 with the deflector rims 161a,b angled inward toward one another. The adjustment slide 126 is shown in the fully open position, opening major portions of the air inlets 124a,b with the slide knobs 128a,b located at the top end of the knob apertures 130a,b. FIG. 7b, a rear cross-sectional view taken along line 7b—7b of FIG. 4, shows many of the same elements shown in FIG. 7a. The release aperture 57 is shown in dotted lines to indicate its location behind the secondary baffle discriminator 163 of the secondary baffle 62. The drainage coupling 138 is also shown extending downward from the basket floor 133 of the base basket 132.

FIGS. 7c and 7d are right and left side cross-sectional views of the misting assembly 40 taken along lines 7c—7c and 7d—7d, respectively, of FIG. 4. The skirt spacer 118 is shown connecting the skirt front panel 121 of the sleeve skirt 120 to the body front panel 114 of the sleeve body 109. The basket front panel 152 is shown located under the skirt spacer 118 between the skirt front panel 121 of the sleeve skirt 120 and the body front panel 114 of the sleeve body 109. In FIG. 7c, the clip arm 148a is shown extending over the clip rail 165a from the clip foot 146 which is connected to the mounting plate 67, and in FIG. 7d, the clip arm 148b is shown extending over the clip rail 165b from the clip foot 146.

FIG. 7d further shows a common emission direction, indicated by arrow "d", extending from the mist nozzle 59 and corresponding to the direction in which most liquid droplets of the nozzle mist 43 (FIG. 2) have a directional component. A general migration direction, indicated by arrow "e", is also shown extending above the primary baffle deflector 159 of the primary baffle 61 and corresponding to the general direction of mist movement through the mist chamber 54 above the primary baffle 61 before contacting the secondary baffle 62 and exiting through the release aperture 57. Preferably, the common emission direction "d" differs from the general migration direction "e" by an angle of less than 90°, and most preferably by 0° in accordance with the preferred embodiment of the present invention, as is shown in the preferred embodiment in FIG. 7d.

FIG. 7d also shows a primary baffle contact angle, indicated by arrow "f", representing the angle formed between a mist contact plane defined by the primary baffle deflector 159 and the common emission direction "d". Preferably, the primary baffle contact angle "f" is an angle other than 90°, and most preferably 45° in accordance with the preferred embodiment of the present invention. Also, a secondary baffle contact angle, indicated by arrow "g", is shown representing the angle formed by a mist contact plane defined by the secondary baffle deflector 163 relative to the general migration direction "e". Preferably, the secondary baffle contact angle "g" is an angle other than 90°, and most preferably 30° in accordance with the preferred embodiment of the present invention.

In the preferred embodiment of the present invention, the arrows "d" and "e" also indicate a mist chamber centerline of the mist chamber 54. In the preferred embodiment of the present invention, the mist contact planes defined by the primary baffle deflector 159 and the secondary baffle deflector 163 both form acute angles, "f", "g", with the mist chamber centerline "d", "e".

OPERATION

Referring back to FIG. 2, water is supplied to the discriminating humidification system 25 of the preferred embodiment of the present invention through tap supply hose 27. When the intake valve assembly 83 is closed, water flow is stopped, allowing maintenance or repair on the elements inside the control box 36, such as cleaning the filter 85. When the intake valve assembly 83 is open, water flows through the filter 85 which contains a screen to remove dirt and particulates from the water which could potentially interfere with the operation of other elements of the discriminating humidification system 25. One example of an acceptable filter 85 is a conventional 450 mesh screen filter.

In the preferred embodiment of the present invention, the pre-pump tubing 86 supplies water from the filter 85 to the high pressure pump 89 and the supply indicator 87. The supply indicator 87 continually evaluates whether water is being supplied to the high pressure pump 89 by monitoring the water pressure in the pre-pump tubing 86. It is understood that unintentional operation of the high pressure pump 89 without a supply of water in the pre-pump tubing 86 may cause damage to the high pressure pump 89. As is shown in FIG. 3, the supply indicator 87 acts as a switch to allow or prevent electrical current flow to the high pressure pump 89 and the control solenoid 95. In the preferred embodiment of the present invention, the supply indicator 87 includes a polyurethane (polyether) diaphragm and has a mechanical contact rating of at least 4 amps for voltages as high as 250 VAC, a proof pressure of 125 psi (pounds per square inch), and a burst pressure of 160 psi. In the preferred embodiment, when water pressure falls below 5 psi, the supply indicator 87 of the preferred embodiment prevents current from flowing to the high pressure pump 89 and the control solenoid 95, thus disabling the high pressure pump 89 and closing the control solenoid 95.

Referring back to FIG. 2, in the preferred embodiment of the present invention, the high pressure pump 89 supplies water to the post-pump tubing 88 at an increased pressure ranging between 120 psi and 250 psi. One example of an acceptable high pressure pump 89 is a pump that will deliver at least 4 gallons per hour at a pressure between 150 psi and 180 psi, operate at 24 volts, and require approximately 5 amps. Other alternate embodiments of the present invention include pumps supplying higher or lower pressures in accordance with the use of alternate mist nozzles 59 to produce acceptable nozzle mist 43 as described herein.

The pressure gauge 94 continually measures and indicates the water pressure in the post-pump tubing 88 to enable a human operator to monitor the water pressure. According to the preferred embodiment of the present invention, the pressure regulator 91 and the feedback line 92 operate as a feedback regulator network which attempts to maintain the water pressure in the post-pump tubing 88 at a pre-selected pressure, regardless of the number of misting assemblies 40 contained in the discriminating humidification system 25. In this way, one or more misting assemblies 40 may be added to or removed from the discriminating humidification system 25 while not affecting the water pressure to each of the misting assemblies 40. Since the amount of water pressure affects the quality of mist emitted from the mist nozzles 59, the pressure regulator 91 and the feedback line 92 help to ensure optimum mist quality.

In the preferred embodiment of the present invention, the pressure regulator 91, often referred to in the industry as a back pressure valve, is designed to, on a continuous or intermittent basis, limit the desired maximum pressure by releasing water into a lower pressure line or area. Back pressure valves, when properly sized, open and close at predetermined points to provide accurate, functional control for continuous protection of pumps and delivery of desired pressures. In the preferred embodiment of the present invention, the pressure regulator 91 is capable of controlling pressures at flow rates as low as 0.4 gallons per hour and as high as 6 gallons per hour at 150 psi.

The control solenoid 95 is a normally closed, electrically-controlled valve which is either open in both directions or closed in both directions. One example of an acceptable control solenoid 95 is a direct acting, 24 VAC valve which operates effectively with water pressures ranging up to 200 psi. Among other functions, the control solenoid 95 selectively prevents water from continuously flowing through the control assembly 35 since, in the preferred embodiment, water would otherwise flow through the high pressure pump 89 due to water pressure from the utility outlet.

In addition to being controlled by supply indicator 87, operation of both the control solenoid 95 and the high pressure pump 89 is controlled by the timer 96. The timer 96 is selectively programmable to a variety of on/off cycle combinations. One example of an acceptable timer 96 is a repeat cycle timer having a relay output rated at 10 amps, a dual input voltage capability (110 VAC or 24 VAC), a multi-timing range of 0.1 second to 10 hours, an "on" dial for setting the amount of "on" time, and an "off" dial for setting the amount of "off" time.

In the preferred embodiment of the present invention, the timer 96 is programmed to both open the control solenoid 95 and operate the high pressure pump 89 for a period of 0.7 seconds to cause water to be pumped at a high pressure through the supply coupling assembly 93 and the supply main 29. This "on" period is followed by an "off" period of 2 seconds when the control solenoid 95 is closed and the high pressure pump 89 is inactive. The timer 96 alternates between these "on" and "off" periods continuously. It should be understood that these "on" and "off" times are selectively variable for use with various types of products and environments in accordance with the objects of the present invention.

As highly pressurized water is supplied to the supply main 29, the water is transferred from the control assembly 35 on a path through both the supply main 29 and the supply tubes 32 to the misting assemblies 40. In the preferred embodiment of the present invention, the high pressure pump 89 also functions as a check valve to prevent water from flowing in the reverse direction from the post-pump tubing 88 to the pre-pump tubing 86. Therefore, when the control solenoid 95 is closed, the water pressure within the post-pump tubing 88 remains relatively constant. However, immediately after the control solenoid 95 is closed, the water pressure in the supply main 29 and the supply tubes 32 begins to fall off since the misting assemblies 40 remain open. When the timer 96 again opens the control solenoid 95, the water pressure in the supply main 29 and the supply tubes 32 is returned to the optimum pressure during the initial portion of the "on" cycle. The amount of water pressure lost during the "off" cycle depends, at least in part, on the length of the "off" cycle and the number of misting assemblies 40.

Referring now to FIGS. 2 and 7*d*, as the pressurized water reaches the misting assembly 40 of the preferred embodiment of the present invention, the water travels into the nozzle assembly 58, beginning with the supply coupling 134. The water then travels through the supply coupling 134 which extends through the supply aperture 35 and into the nozzle coupling assembly 157 before entering the mist nozzle 59. The mist nozzle 59 accepts the water from the nozzle coupling assembly 157 and, in accordance with the preferred embodiment of the present invention, emits the nozzle mist 43 through the nozzle orifice 156 (FIG. 7*a*).

The nozzle mist 43, defining a nozzle-specific spray pattern, includes a plurality of separate and independent water droplets moving toward the primary baffle deflector 159, each of which droplets has a directional component in the common emission direction "d". In the preferred embodiment of the present invention, water droplets of the nozzle mist 43 vary in size from 5 microns to over 60 microns. One example of an acceptable mist nozzle 59 sprays mist in a 45-degree conical spray pattern at a rate of 0.8–1.3 gallons per hour when receiving water at a pressure of 150 psi. It is understood that the pressure of the water supplied to the mist nozzle 59 affects the size of the water droplets of the nozzle mist 43, thus the water pressure is preferably maintained within an optimum range during the "on" period to induce emission of the finest possible nozzle mist 43. This optimum range of pressure for the preferred mist nozzle 59 includes pressures greater than 120 psi.

The primary baffle 61 and discriminator 48 provide a means for refining the nozzle mist 43. The primary baffle 61 is so located and oriented relative to the mist nozzle 59 that most, if not all, of the nozzle mist 43 contacts the primary baffle deflector 159 of the primary baffle 61. After making contact, it is believed that while the larger droplets of the nozzle mist 43 tend to collect on the primary baffle deflector 159 or fall toward the basket floor 133, the smaller droplets in the nozzle mist 43 tend to bounce from the primary baffle deflector 159 to contact the body front panel 114 and continue upward toward the secondary baffle 62 as the mid-chamber mist 41. The deflector rims **161*a,b* are positioned to deter droplets from migrating through the air inlets 124*a,b* after contacting the primary baffle deflector 159**.

As the mid-chamber mist 41 moves through the mist chamber 54, the primary baffle 61 and secondary baffle 62 are so located and oriented relative to each other and to the mist chamber 54 that most of the mid-chamber mist 41 contacts another inside surface of the discriminator 48, such as the mounting plate 67 and the secondary baffle deflector 163, before being released through the release aperture 57 as the fine mist 42. It is further believed that most of the remaining larger water droplets tend to adhere to the various inside surfaces of the discriminator 48, including the secondary baffle deflector 163, whereas the smaller and lighter water droplets tend to migrate upward and outward through the release aperture 57 to be released as the fine mist 42. As the larger water droplets continue to collect on the inside surfaces of the discriminator 48, they begin to accumulate and drain downward toward the basket floor 133 of the base portion 65. The draining water then passes through the drain coupling 138, the drain tube 33, and the drain main 30.

In the preferred embodiment of the present invention, the sizes, shapes, locations and orientations of the elements of the misting assembly 50, as well as relationships between the common emission direction "d", the general migration direction "e", the primary baffle contact angle "f", and the secondary baffle contact angle "g", are such that most of the water droplets which are finally released as the fine mist 42 are directed, after bouncing off of the primary baffle deflector 159, to impact at least two surfaces of the discriminator 48, such as the body front panel 114 and the mounting plate 67, or the body front panel 114 and the secondary baffle deflector 163.

The adjustment slide 126 provides a means for at least partially occluding the air inlets 124. The position of the adjustment slide 126 can be changed to vary the amount of fine mist 42 released from the release aperture 57. More fine mist 42 will be released from the release aperture 57 when the adjustment slide 57 is positioned in the fully open position shown in FIG. 7d, whereas a smaller amount of fine mist 42 will be released from the release aperture 57 when the adjustment slide 126 is closer to the fully closed position shown in FIG. 6. It is believed that as the sizes of the air inlets 124 are increased, more air is allowed to enter the mist chamber 54 through the air inlets 124 so that more fine mist 42 is released through the release aperture 57.

In the preferred embodiment of the present invention, no significant air flow from other sources is directed toward the mist assembly 40. Thus, air from other sources is not, according to the preferred embodiment, directed into the air inlets 124 to create one type of "pushing" mist 41, 43 and air through the mist chamber 54, nor is air directed across the release aperture 57 to decrease pressure at the release aperture 57 to "pull" mist 41, 43 and air through the mist chamber 54. Instead, movement of mist 41, 43 and air through the mist chamber 54 is primarily in response to movement of the nozzle mist 43 (FIG. 2) and resulting mid-chamber mist 41, both of which derive kinetic energy from pressure within the mist nozzle 59 created by the high pressure pump 89 (FIG. 2) of the present invention. Thus, the mist 41, 43 creates a preferred type of "pushing" the mist 41, 43 and air through the mist chamber 54. It is understood that the shape and size of the discriminator 48, as well as the shape, sizes, and locations of other elements of the misting assembly 50, such as the primary baffle 61, affect this and other important and unique aspects of the present invention.

According to alternate embodiments of the present invention, air is directed from other sources, such as the refrigeration outlets 17 (FIG. 1), into the air inlets 124a,b to assist the mist 41, 43 in "pushing" the air and mist 41, 43 through the mist chamber 54. The adjustment slide 126 may be positioned to reduce air flow into the mist chamber 54 through the air inlets 124a,b to reduce the amount of pushing force the air and mist 41, 43 receive from the air directed into the mist chamber 54 from other sources.

The fine mist 42 is composed of water droplets which are sufficiently small, typically ranging between 1 and 20 microns in the preferred embodiment of the present invention, to evaporate before contacting perishables contained within the refrigerated case 10 (FIG. 1). It is a goal of the preferred embodiment of the present invention to coordinate, without limitation, droplet size, droplet speed, droplet weight, droplet initial direction of travel, shape and size of discriminator 48 and primary baffle 61, and location and orientation of mist nozzle 59 and primary baffle 61 to minimize the possibility that undesirably large droplets will exit the release aperture 57 as part of the fine mist 42. In addition to the size, speed, emission rate, and initial direction of travel of the water droplets emitted from the mist nozzle 59, all of which are determined, in part, by the water pressure and type of mist nozzle 59, the shape and dimensions of the discriminator 48 of the preferred embodiment of the present invention affect the fine mist 42 which is released into the refrigerated space 15 and provide control over the distribution of moisture into the refrigerated space 15.

The position and orientation of the mist nozzle 59 also affect various qualities of the mist released from the misting assembly 40. In the preferred embodiment of the present invention, the mist nozzle 59 is located below the release aperture 57 at the bottom of the mist chamber 54 and is oriented so that the nozzle orifice 156 is directed in the general direction of the release aperture 57. As the nozzle mist 43 is emitted from the nozzle orifice 156, the initial directions taken by the droplets of the nozzle mist 43 aid in the migration of the smaller droplets which eventually form the fine mist 42. In other words, in the preferred embodiment of the present invention, the initial direction taken by each of the droplets of the nozzle mist 43 includes a vector component of direction toward the release aperture 57.

Also, the misting assembly 40 of the preferred embodiment of the present invention is easily assembled and maintained. In the preferred embodiment of the present invention, the discriminator 48 is composed of spot-welded stainless steel elements. The base portion 65, nozzle assembly 58, and primary baffle 61 are first mounted to a support post 22 (FIG. 1), and the supply tube 32 and drain tube 33 are connected to the supply coupling 134 and drainage coupling 138, respectively. The sleeve portion 50 is then attached to the mounted base portion 65. Referring to FIGS. 5 and 6, to attach the sleeve portion 50 to the base portion 65, the lower end of the sleeve body 109 is positioned to be inserted into the basket cavity 150 as the base clip 144 is inserted through the clip gap 166 between the clip rails 165a,b and the slide rails 167a,b, which clip gap 166 is clear since the adjustment slide 126 is in the closed position as shown. The sleeve portion 50 is then slid downward with respect to the base portion 65 so that the clip arms 148a,b slide over the clip rails 165a,b until the lower end of the sleeve body contacts the basket floor 133 of the base basket 132. By reversing this procedure, the misting assembly 50 is easily cleaned or disassembled for replacement. Furthermore, since the primary baffle 61 is removably attached to the nozzle assembly 58, retrofitting the misting assembly 50 with alternately shaped primary baffles 61 and/or alternate nozzle assemblies 58 is simplified.

ALTERNATE EMBODIMENTS

It is intended that the scope of the present invention also include various alternate embodiments. Nevertheless, it should be understood that the each of the embodiments disclosed herein, including the preferred embodiment, includes features and characteristics which are considered independently inventive. Accordingly, the disclosure of variations and alterations expressed in alternate embodiments is intended only to reflect on the breadth of the scope of the present invention without suggesting that any of the specific features and characteristics of the preferred embodiment are more obvious or less important.

One alternate embodiment of the present invention is represented by FIGS. 8–10d, which differ from the preferred embodiment by the shape and location of an alternate primary baffle 61' and the use of an alternate nozzle coupling assembly 157' to form an alternate nozzle assembly 58'. FIG. 8 is a front perspective view of a base portion 65 and a nozzle assembly 58' which are similar to those of the preferred embodiment. However, no baffle, such as primary baffle 61 (FIG. 5), is connected to the nozzle assembly 58'. Instead, referring to FIG. 9, an alternate primary baffle 61' is shown attached to the body front panel 114 of the sleeve body 109 of the sleeve portion 50' of the alternate embodiment. The other elements of the sleeve portion 50', including those shown in FIGS. 9a–9d, are similar to those of the preferred embodiment. FIG. 9e shows an isolated perspective view of the primary baffle 61' and reveals a primary baffle base 158' for attachment to the body front panel 114 and a rectangular primary baffle deflector 159' connected to the primary baffle base 158'. FIGS. 10a–10d show cross-sectional views similar to FIGS. 7a–7d of the alternate misting assembly 40'.

FIGS. 11a–11d show cross-sectional views similar to FIGS. 7a–7d of yet another alternate misting assembly 40". The discriminator 48 is identical to that of the preferred embodiment (FIGS. 7A–7D). However, the alternate misting assembly 40" includes an alternate nozzle assembly 58" and does not include any type of primary baffle 61 (FIG. 5). While the mist nozzle 59 of the nozzle assembly 58 of the preferred embodiment (FIG. 5) is preferably constructed of less expensive plastic, the mist nozzle 59' of the nozzle assembly 58" of the alternate embodiment of FIGS. 11a–11d is preferably constructed of brass or stainless steel and emits a finer mist through the nozzle orifice 156', thus the alternate misting assembly 40" functions satisfactorily without a primary baffle 61.

The scope of the present invention is also considered to include other alternately shaped discriminators 48. In other alternate embodiments of the present invention, discriminators 48 define unitary structures of various compositions, define mist chambers 54 of various shapes and sizes, include one or more alternately shaped release apertures 57, and include alternate draining paths. Alternately shaped discriminators 48 include discriminators 48 having various cross-sectional shapes such as triangles, squares, hexagons, pentagons, hexagons, ovals, etc. Furthermore, other discriminators 48 include adjustable release apertures 57 and mist directing devices. Although the scope of the present invention is understood to include many variously shaped discriminators 48 in alternate embodiments, the inventiveness of various features of the discriminator 48 of the preferred embodiment, such as the unique control function provided by that of the preferred embodiment, should not be limited by inclusion of such alternate embodiments.

It should also be understood that other mist nozzles 59 included within the scope of the present invention require alternate amounts of water pressure to emit the finest mist available from the alternate mist nozzles 59, thus it should be understood that one or more alternate high pressure pumps 89 or pressure regulators 91 are accordingly substituted, or appropriate adjustments are made to the preferred pressure regulator 91, to accommodate alternate mist nozzles 59.

Attention is also directed to the specification and claims of U.S. patent application Ser. No. 07/830,190, filed Jan. 31, 1992, allowed Sep. 9, 1992, as U.S. Pat. No. 5,193,354 which is hereby incorporated by reference.

It should also be understood that each of the individual variations from the preferred embodiment of the present invention discussed in relation to the alternate embodiments of the present invention are separate and distinct. Furthermore, all combinations of the different variations are considered to be within the scope of the present invention.

While the embodiments of the present invention which have been disclosed herein are the preferred forms, other embodiments of the apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimensions and relationships shown on the drawings are given as the preferred relative dimensions and relationships, but the scope of the invention is not to be limited thereby.

We claim:

1. An apparatus for converting a liquid into a refined mist, said apparatus comprising:
   a mist means for converting a liquid into a first mist; and
   a discriminator means for facilitating mist and air being pushed therethrough and for interacting with the first mist to refine the first mist into a refined mist, said discriminator means defining a mist chamber associated with said mist means.

2. Apparatus of claim 1, wherein said discriminator means includes means for interacting with the first mist to facilitate the first mist primarily causing mist and air to move within said mist chamber.

3. Apparatus of claim 1, further including a baffle means located within said discriminator means for deflecting the first mist.

4. Apparatus of claim 3, wherein said discriminator means further defines, at least, a release aperture for releasing refined mist, and wherein said baffle means includes, at least, a primary baffle assembly located within the mist chamber between said mist means and said release aperture.

5. Apparatus of claim 3, wherein said baffle means is connected to said mist means.

6. Apparatus of claim 3, wherein said baffle means is connected to said discriminator means.

7. Apparatus of claim 3, wherein said baffle means includes, at least, a deflector defining a contact plane, and wherein said first mist includes, at least, a plurality of droplets all travelling in directions having a directional component in a common emission direction which forms an angle other than a right angle with the contact plane.

8. Apparatus of claim 4, wherein said first mist includes, at least, a plurality of droplets all travelling in directions having a directional component in a common emission direction, wherein said first mist migrates in the mist chamber in a general migration direction toward the release aperture, and wherein the common emission direction is less than 90° away from the general migration direction.

9. Apparatus of claim 3, wherein said baffle means includes, at least, a base, a deflector, and at least oe deflector rim depedig from said deflector.

10. Apparatus of claim 3, wherein said baffle means includes, at least, means for deflecting the first mist toward contact with the discriminator means.

11. Apparatus of claim 1, wherein said discriminator means further defines, at least, an air inlet, and an air outlet.

12. Apparatus of claim 11, wherein said discriminator means includes, at least, an adjustment means for at least partially occluding the air inlet.

13. Apparatus of claim 1, wherein said discriminator means includes, at least,
   a base connected to said mist means and
   a sleeve connected to said base.

14. Apparatus of claim 13, wherein said sleeve defines, at least, an air inlet and an air outlet, and wherein said sleeve partially defines said mist chamber.

15. Apparatus of claim 14, wherein said sleeve includes, at least, an adjustment means for at least partially occluding the air inlet.

16. Apparatus of claim 14, wherein the air inlet defines a first air inlet and wherein said sleeve further defines a second air inlet located across the mist chamber from the first air inlet.

17. Apparatus of claim 1, wherein said discriminator means further defines a mist means receipt portal, a drainage aperture, and a mist release aperture, and wherein, except for the mist means receipt portal, the drainage aperture, and the mist release aperture, the mist chamber is completely enclosed.

18. Apparatus of claim 1,
wherein said discriminator means further defines a release aperture for releasing the refined mist, and
wherein said discriminator means further includes a baffle means located within said mist chamber for cooperating with the first mist to cause at least a portion of the first mist to travel in a direction having a directional component toward said release aperture subsequent to all contact with the said baffle means.

19. Apparatus of claim 18,
wherein the first mist includes, at least, a plurality of droplets,
wherein the plurality of droplets includes, at least, droplets that eventually become refined mist, and
wherein subsequent to all cooperating between said baffle means and the at least a portion of the first mist, said baffle means has caused all of the droplets that eventually become refined mist to travel in a direction having a directional component toward said release aperture.

20. Apparatus of claim 1, wherein said discriminator means further includes, at least,
an inner wall at least partially defining said mist chamber, and
a baffle means located within said mist chamber for cooperating with the first mist to cause at least a portion of the first mist to travel in a direction having a directional component toward said inner wall subsequent to all contact with said baffle means.

21. Apparatus of claim 20,
wherein the first mist includes, at least, a plurality of droplets,
wherein the plurality of droplets includes, at least, droplets that eventually become refined mist, and
wherein subsequent to all cooperating between said baffle means and the at least a portion of the first mist, said baffle means has caused all of the droplets that eventually become refined mist to travel in a direction having a directional component toward said inner wall.

22. Apparatus of claim 20,
wherein said discriminator means further defines a release aperture for releasing the refined mist, and
wherein the direction in which said baffle means has caused the at least a portion of the first mist to travel further has a directional component toward said release aperture.

23. Apparatus of claim 22,
wherein the first mist includes, at least, a plurality of droplets,
wherein the plurality of droplets includes, at least, droplets that eventually become refined mist, and
wherein subsequent to all cooperating between said baffle means and the at least a portion of the first mist, said baffle means has caused all of the droplets that eventually become refined mist to travel in a direction having a directional component toward said inner wall and a directional component toward said release aperture.

24. Apparatus of claim 6,
wherein at least a portion of the first mist has a first directional component defined in a direction from said mist means toward said release aperture, and
wherein said primary baffle assembly includes means for maintaining said first directional component of the at least a portion of the first mist.

25. Apparatus of claim 24,
wherein said the first mist includes, at least, a plurality of droplets,
wherein the plurality of droplets includes, at least, droplets that eventually become refined mist, and
wherein said primary baffle assembly is constructed and oriented so as to maintain said first directional component of all of the droplets that eventually become refined mist.

26. Apparatus of claim 4, wherein said primary baffle assembly includes a flattened planar surface.

27. An apparatus for converting a liquid into a refined mist, said apparatus comprising:
a nozzle defining a nozzle aperture for emitting noble liquid;
a first baffle located to be contacted by liquid from the nozzle aperture and including, at least, a deflector surface defining a contact plane; and
a second baffle including, at least, a deflector surface defining a contact plane,
wherein said contact plane of said deflector surface of said first baffle and said contact plane of said deflector surface of said second baffle each form baffle contact angles with the chamber centerline which are both either acute or obtuse angles.

28. An apparatus for converting a liquid into a refined mist, said apparatus comprising:
a nozzle defining a nozzle aperture for emitting nozzle liquid;
a first baffle located to be contacted by liquid form the nozzle aperture and including, at least, a deflector surface defining a contact plane; and
a second baffle including, at least, a deflector surface defining a contact plane,
wherein one of said contact plane of said deflector surface of said first baffle and said contact plane of said deflector surface of said second baffle forms an acute angle with the chamber centerline, and the other an obtuse angle.

29. A droplet discrimination apparatus for refining mist from a mist nozzle, said apparatus comprising:
a base portion for connection to a mist nozzle;
a sleeve portion defining an air inlet and an air outlet and at least partially defining a mist chamber between the air inlet and said air outlet; and
a first baffle connected to said sleeve portion and located at one end of the mist chamber and a second baffle connected to said sleeve portion and located within the mist chamber.

30. Apparatus of claim 29, wherein said base portion defines a mist nozzle receipt portal for receiving the mist nozzle, and wherein said second baffle includes, at least, a flange member connected to said sleeve and extending into the mist chamber at a location between the mist nozzle receipt portal and the air outlet.

31. Apparatus of claim 29, wherein said base portion includes, at least, means for connecting said droplet discrimination apparatus to a support structure.

32. Apparatus of claim 29, further comprising a means for at least partially occluding the air inlet.

33. Apparatus of claim 29, wherein the air inlet defines a first air inlet, and wherein said sleeve portion further defines a second air inlet located across the mist chamber from the first air inlet.

34. An apparatus for creating a discriminated mist, said apparatus comprising:

a mist means for receiving a liquid, for converting the liquid into a plurality of droplets, and for substantially completing any decreasing of the size of each droplet of the plurality of droplets; and a discriminator means associated with said mist means for segregating the plurality of droplets, wherein said discriminator means includes, at least, a baffle means for deflecting the plurality of droplets.

35. Apparatus of claim 34, wherein said apparatus further comprises a pressurized source of the liquid, and wherein said mist means includes, at least, a nozzle defining an orifice therethrough, wherein said orifice is in fluid communication with said pressurized source of the liquid and the plurality of droplets discharge from said orifice, wherein the decreasing of the size of the plurality of droplets is substantially completed when the plurality of droplets discharge from said orifice.

36. Apparatus of claim 34, wherein the plurality of droplets includes larger droplets and smaller droplets, and wherein said discriminator means is so constructed that said discriminator means collects a majority of the larger droplets and discharges a majority of the smaller droplets.

37. An apparatus for creating a discriminated mist, said apparatus comprising:

a structure including an inner surface defining a mist chamber having a first end and a second end, wherein said inner surface further defines a release aperture located toward said second end;

a mist means for converting a liquid into a mist, wherein said mist means includes, at least, a mist aperture disposed within said first end of said mist chamber for introducing the mist into said mist chamber, wherein the mist includes larger droplets and smaller droplets, and wherein said mist means is so constructed that a majority of the larger droplets and smaller droplets have a first directional component defined in a direction from said mist aperture toward said release aperture; and a baffle means constructed for maintaining said first directional component of a majority of the smaller droplets and collecting a portion of the larger droplets, whereby said apparatus functions to dissuade the larger droplets from passing through said release aperture with the smaller droplets.

38. Apparatus of claim 37, wherein said baffle means is further constructed for collecting a first portion of the larger droplets, and for imparting a second directional component upon a second portion of the larger droplets, wherein said second directional component is generally transverse to said first directional component, whereby a majority of the second portion of the larger droplets engage and are collected by said inner surface of said structure, whereby a majority of the larger droplets are collected within said mist chamber and a majority of the smaller droplets pass through said release aperture.

39. Apparatus of claim 37, wherein said mist chamber defines a centerline extending from said first end to said second end, wherein said baffle means includes, at least, a primary baffle disposed between said mist aperture and said second end, wherein said primary baffle includes, at least, a planar portion intersecting said centerline and defining an obtuse angle therewith.

40. Apparatus of claim 39, wherein said baffle means further includes, at least, a second baffle disposed between said primary baffle and said second end, wherein said second baffle includes, at least, a planar portion intersecting said centerline and defining an obtuse angle therewith.

41. Apparatus of claim 40, wherein said second baffle is located opposite from said release aperture.

42. An apparatus for converting a liquid into a refined mist, said apparatus comprising:

a mist means for converting a liquid into a first mist; and a discriminator means associated with said mist means for refining the first mist into a refined mist, wherein said discriminator means defines a mist chamber for receiving the first mist and a release aperture for releasing the refined mist,and includes, at least, a first baffle located inside said mist chamber, and a second baffle located inside said mist chamber at a location nearer said release aperture than to said mist means.

43. Apparatus of claim 42, wherein said discriminator means further defines a mist chamber centerline, wherein said first baffle defines a primary mist contact plane forming a primary baffle contact angle with the mist chamber centerline, wherein said second baffle defines a secondary mist contact plane forming a secondary baffle contact angle with the mist chamber centerline, and wherein the primary baffle contact angle and the secondary baffle contact angle both define either acute or obtuse angles.

44. Apparatus of claim 42, wherein said discriminator means further defines a mist chamber centerline, wherein said first baffle defines a primary mist contact plane forming a primary baffle contact angle with the mist chamber centerline, wherein said second baffle defines a secondary mist contact plane forming a secondary baffle contact angle with the mist chamber centerline, and wherein one of the primary baffle contact angle and the secondary baffle contact angle defines an acute angle and the other defines an obtuse angle.

45. Apparatus of claim 42, wherein said discriminator means further defines an air inlet for allowing air to enter said mist chamber.

46. Apparatus of claim 42, wherein said discriminator means is so constructed that mist and air are primarily pushed within said mist chamber.

47. Apparatus of claim 42, wherein said discriminator means is so constructed that mist and air move within said mist chamber primarily in response to movement of the first mist.

48. Apparatus of claim 42,
wherein said discriminator means further defines a release aperture for releasing the refined mist, and
wherein said first baffle and said second baffle cooperate with the first mist,
wherein, said first baffle is so constructed that, subsequent to all cooperating between said first baffle and a first portion of the first mist, said first baffle has caused the first portion of the first mist to travel in a first direction having a directional component toward said second baffle, and
wherein, said second baffle is so constructed that, subsequent to all cooperating between said second baffle and a second portion of the first mist, said second baffle has caused the second portion of the first mist to travel in a direction having a directional component toward said release aperture.

49. Apparatus of claim 42, wherein said first baffle is adjacent to said mist means.

* * * * *